United States Patent
Xie et al.

(10) Patent No.: US 11,379,699 B2
(45) Date of Patent: Jul. 5, 2022

(54) OBJECT DETECTION METHOD AND APPARATUS FOR OBJECT DETECTION

(71) Applicant: BAIDU ONLINE NETWORK TECHNOLOGY (BEIJING) CO., LTD., Beijing (CN)

(72) Inventors: Yuanfan Xie, Beijing (CN); Zishu Yang, Beijing (CN); Liang Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 295 days.

(21) Appl. No.: 16/561,942

(22) Filed: Sep. 5, 2019

(65) Prior Publication Data
US 2020/0082207 A1    Mar. 12, 2020

(30) Foreign Application Priority Data

Sep. 7, 2018 (CN) .......................... 201811044827.7

(51) Int. Cl.
*G06K 9/62* (2022.01)
*G01S 7/48* (2006.01)
(Continued)

(52) U.S. Cl.
CPC ............ *G06K 9/629* (2013.01); *G01S 7/4802* (2013.01); *G01S 17/42* (2013.01); *G01S 17/89* (2013.01);
(Continued)

(58) Field of Classification Search
CPC . G06T 2207/10028; G06T 19/20; G06T 7/11; G06T 1/00; G06K 9/6202; G06K 9/66; G06V 40/174; G06V 20/58
See application file for complete search history.

(56) References Cited

U.S. PATENT DOCUMENTS 7,912,246 B1 * 3/2011 Moon .................. G06K 9/6267
382/118
8,380,375 B2 * 2/2013 Tink ....................... G01C 21/06
701/21
(Continued)

FOREIGN PATENT DOCUMENTS

CN       106707293 A     5/2017
CN       106815847 A     6/2017
(Continued)

OTHER PUBLICATIONS

Extended European Search Report for EP Application No. 19191471.2, dated Jan. 29, 2020, 7 pages.
(Continued)

*Primary Examiner* — Yosef Kassa
(74) *Attorney, Agent, or Firm* — Fay Sharpe LLP

(57) ABSTRACT

Embodiments of the present disclosure disclose an object detection method, an object detection apparatus, a related device, a storage medium and a vehicle. The method includes the following. Scene point cloud data is inputted into a point cloud feature extraction model pretrained to obtain a point cloud descriptive feature of the scene. Scene image data is input into an image feature extraction model pretrained to obtain an image descriptive feature of the scene. The point cloud descriptive feature and the image descriptive feature of each target region in the scene are input into an object identifying model to obtain a detection result of an object included in each target region.

15 Claims, 6 Drawing Sheets

(51) Int. Cl.
  *G01S 17/42* (2006.01)
  *G01S 17/89* (2020.01)
  *G06V 10/25* (2022.01)
  *G06V 10/40* (2022.01)

(52) U.S. Cl.
  CPC ........... *G06K 9/6256* (2013.01); *G06V 10/25* (2022.01); *G06V 10/40* (2022.01)

(56) References Cited

U.S. PATENT DOCUMENTS

| | | | | |
|---|---|---|---|---|
| 8,805,058 B2* | 8/2014 | Zebedin | ................. | G06F 30/13 |
| | | | | 382/173 |
| 9,152,870 B2* | 10/2015 | Sawhney | ............ | G06K 9/6253 |
| 9,208,607 B2* | 12/2015 | Chu | ........................ | G06T 17/00 |
| 9,255,803 B2* | 2/2016 | Liu | ........................ | G01C 21/06 |
| 9,317,785 B1* | 4/2016 | Moon | .................. | G06V 40/172 |
| 9,338,622 B2* | 5/2016 | Bjontegard | ............. | H04L 67/22 |
| 9,542,626 B2* | 1/2017 | Martinson | ............. | G06V 10/82 |
| 10,229,332 B2 | 3/2019 | Hu | | |

FOREIGN PATENT DOCUMENTS

| | | |
|---|---|---|
| CN | 108171217 A | 6/2018 |
| CN | 108229366 A | 6/2018 |
| CN | 108229548 A | 6/2018 |
| JP | 2017-146840 A | 8/2017 |
| JP | 2018-73308 A | 5/2018 |
| JP | 2018-124973 A | 8/2018 |

OTHER PUBLICATIONS

Chen et al., "Multi-View 3D Object Detection Network for Autonomous Driving", Department of Electronic Engineering, Tsinghua University Baidu Inc., 9 pages.
Office Action for Chinese Application No. 201811044827.7, dated Apr. 7, 2020.
Xiaozhi Chen et al., "Multi-View 3D Object Detection Network for Autonomous Driving", 9 pages.
Office Action for corresponding JP application No. 2019-163303, dated Sep. 30, 2020, 7 pages.
Translation of Office Action for corresponding JP application No. 2019-163303, dated Sep. 30, 2020, 7 pages.

* cited by examiner

OBJECT DETECTION METHOD AND APPARATUS FOR OBJECT DETECTION

CROSS REFERENCE TO RELATED APPLICATIONS

This application claims priority and benefits to Chinese Application No. 201811044827.7, filed on Sep. 7, 2018, the entire content of which is incorporated herein by reference.

FIELD

The present disclosure relates to a field of sensor technology, and more particularly, to an object detection method, an object detection apparatus, a related device, a storage medium and a vehicle.

BACKGROUND

With development of sensor technology, compared with a detection manner of detecting an object or scene by a single sensor, a detection manner of detecting a same object or scene simultaneously by multiple sensors and fusing detection data of the multiple sensors has a more comprehensive and accurate detection result. Thus, a multi-sensor detection manner is widely used in a field of object detection or target tracking.

SUMMARY

Embodiments of the present disclosure provide an object detection method. The method includes:

inputting scene point cloud data of a scene into a point cloud feature extraction model pretrained to obtain a point cloud descriptive feature of the scene, inputting scene image data of the scene into an image feature extraction model pretrained to obtain an image descriptive feature of the scene; and inputting the point cloud descriptive feature and the image descriptive feature of each target region in the scene into an object identifying model pretrained to obtain a detection result of an object included in each target region.

Embodiments of the present disclosure provide an electronic device. The electronic device includes:

one or more processors; and a memory, configured to store one or more programs that when executed by the one or more processors cause the one or more processors to perform the object detection method according to the first aspect.

embodiments of the present disclosure provide a non-transitory computer readable storage medium, having computer programs stored thereon that when executed by a processor cause the processor is configured to execute the object detection method according to the first aspect.

BRIEF DESCRIPTION OF THE DRAWINGS

In order to clearly illustrate technical solutions of embodiments of the present disclosure, a brief description will be made to drawings used in embodiments below. It should be understood, the drawings in the following descriptions are only part embodiments of the present disclosure, and should not be construed as limitations of the scope of the present disclosure. For those skilled in the art, other drawings can be obtained based on these drawings without creative labor.

DETAILED DESCRIPTION

Figure 1:
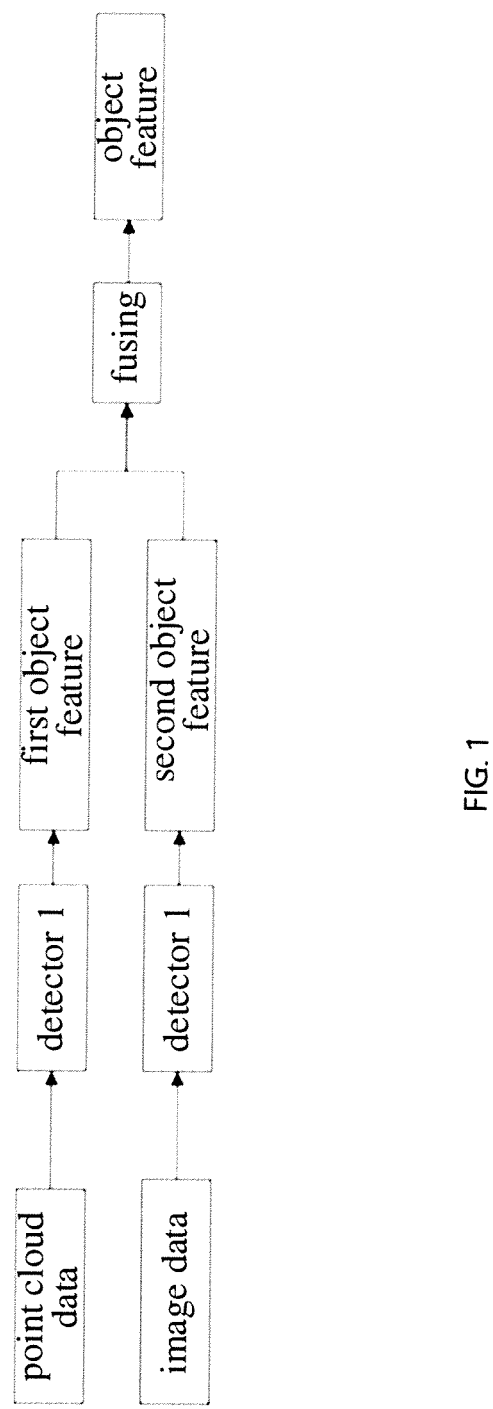
FIG. 1 is a schematic diagram illustrating a typically post-processing of the prior art.

The present disclosure will be described in detail below with reference to the accompanying drawings and embodiments. It should be understood, the specific embodiments described herein are only used to explain the present disclosure rather than limiting the present disclosure. In addition, it should also be noted that, for convenience of description, only part but not all structures related to the present disclosure are illustrated in the accompanying drawings.

It should be noted that, similar reference numerals and letters indicate similar items in the accompanying drawings. Thus, once an item is defined in a drawing, it does not need to further define and explain the item in other drawings. In addition, in the description of the present disclosure, terms such as "first" and "second" are used herein for purposes of differentiation and are not intended to indicate or imply relative importance or significance.

In related arts, a post-fusion multi-sensor detection scheme is usually adopted in the multi-sensor detection scheme. A typical post-fusion process is illustrated in FIG. 1, which fuses detection results. A sensor 1 and a sensor 2 respectively transmit sensor data to two different detectors to obtain a first object feature and a second object feature. The first object feature and the second object feature are fused such that a posterior probability is maximized, to obtain an object feature.

However, the existing post-fusion multi-sensor detection scheme needs a rule and a probability as a fusion basis to relate the data to each other. As a result, the existing scheme has a relative long process time and a relative high delay on the one hand. On the other hand, it is unable to optimize the whole fusion system through data driving. Thus, it is necessary to provide a new multi-sensor fusion scheme for the object detection.

Therefore, embodiments of the present disclosure provide an object detection method, an object detection apparatus, a related device, a storage medium and a vehicle, to realize an object detection while simplifying a detection process.

According to the object detection method, the object detection apparatus, the related device, the storage medium and the vehicle, the scene point cloud data is input into the point cloud feature extraction model pretrained to obtain the point cloud descriptive feature of the scene, the scene image data is input into the image feature extraction model pretrained to obtain the image descriptive feature of the scene. The point cloud descriptive feature and the image descriptive feature of each target region in the scene are input into the object identifying model pretrained to obtain the detection result of the object included in each target region.

Compared with an existing post-fusion multi-sensor detection scheme, the present disclosure may provide a pre-fusion multi-sensor detection scheme, which does not need to apply a rule and a probability as a fusion basis to relate data to each other, thereby simplifying a detection process while detecting the object.

Figure 2A:
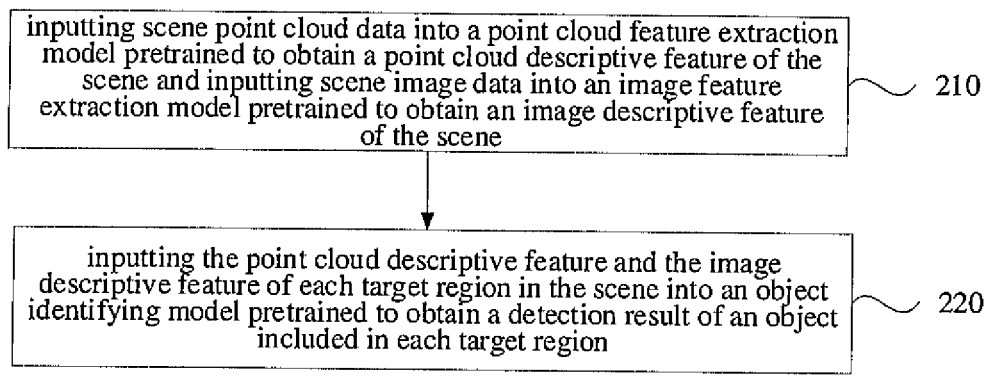
FIG. 2A is a schematic diagram illustrating an object detection method according to embodiments of the present disclosure.
Figure 2B:
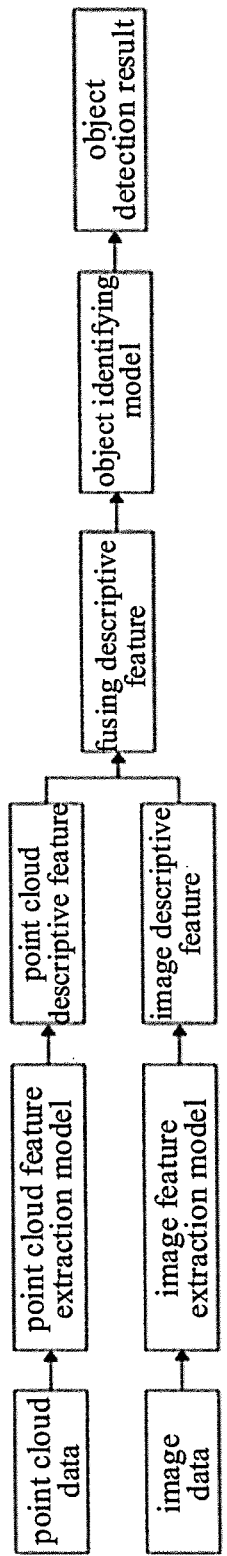
FIG. 2B is a schematic diagram illustrating an object detection process applicable to embodiments of the present disclosure.

FIG. 2A is a schematic diagram illustrating an object detection method according to embodiments of the present disclosure. FIG. 2B is a schematic diagram illustrating an object detection process applicable to embodiments of the present disclosure. The method and the process may be applicable to simplifying a detection process while detecting an object included in the scene. The method may be executed by the object detection apparatus according to embodiments of the present disclosure. The apparatus may be implemented in software and/or hardware. The apparatus may be an individual physical device and may be integrated in a terminal, such as a control framework of an autonomous driving mobile carrier. As illustrated in FIGS. 2A and 2B, the method may specifically include the following.

At block 210, scene point cloud data of a scene is input into a point cloud feature extraction model pretrained to obtain a point cloud descriptive feature of the scene, scene image data of the scene are input into an image feature extraction model pretrained to obtain an image descriptive feature of the scene.

The point cloud data refers to a set of points in three-dimensional (3D) coordinates, which may be used to represent an outer surface shape of an object. Geometric position information of each point in a 3D space may be represented by (x, y, z). In addition, the point cloud data may also represent RGB (Red-Green-Blue) colors, a gray value, a depth, a segmentation result of each point. The image data refers to a set of points in a two-dimensional (2D) coordinate system, which may be also a set of gray values of each pixel represented in numerals. In embodiments, a laser radar and an imager (such as a camera) may be used to synchronously collect a scene to obtain the scene point cloud data and the scene image data respectively.

The point cloud descriptive feature refers to a feature for describing a 3D scene point cloud model constructed by the scene point cloud data, which may be an object feature in the scene. The image descriptive feature refers to a feature for describing a 2D scene image model constructed by the scene image data, which may also be the object feature in the scene. The point cloud descriptive feature and the image descriptive feature may describe a same object in different dimensions, or describe different objects.

Figure 2C:
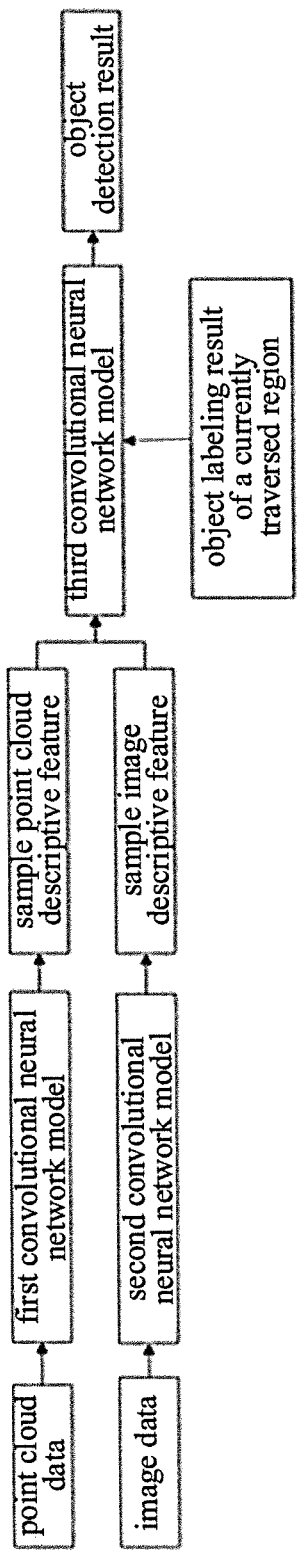
FIG. 2C is a schematic diagram illustrating a synchronous training process of three models applicable to embodiments of the present disclosure.

Both the point cloud feature extraction model and the image feature extraction model may be obtained by training a convolutional neural network in advance. As illustrated in FIG. 2C, a specific implementation may include the following. The laser radar and the imager may be used to collect a sample scene in advance to obtain sample point cloud data and sample image data respectively. The sample point cloud data may be inputted into a first convolutional neural network model to obtain a sample point cloud descriptive feature. The sample image data may be inputted into a second convolutional neural network model to obtain a sample image descriptive feature. The sample point cloud data may be divided into multiple regions in a coordinate system of laser radar by evenly arranging object blocks of a preset size. All regions of the sample point cloud data may be traversed to input the sample point cloud descriptive feature of each region and the sample image descriptive feature corresponding to the sample point cloud descriptive feature of each region into a third convolutional neural network model. The first, the second and the third convolutional neural network models may be trained simultaneously based on an object labeling result of the each region in the sample point cloud data, until the third convolutional neural network model may provide an accurate detection result, such as a classification, a position and an orientation of each object. Therefore, the point cloud feature extraction model, the image feature extraction model and an object identifying model may be obtained. The first convolutional neural network model may correspond to the point cloud feature extraction model. The second convolutional neural network model may correspond to the image feature extraction model. The third convolutional neural network model may correspond to the object identifying model.

It should be noted that, in embodiments, the sample point cloud data, the sample image data and the object labeling results of each region in the sample point cloud data are simultaneously input into the first, the second and the third convolutional neural network models respectively for training. Therefore, the training may be end when the third convolutional neural network model outputs an accurate detection result, regardless of the detection results outputted by the first and the second convolutional neural network models. Compared with a manner of training the first, the second and the third models one by one, the method may reduce a complexity of training.

In detail, the scene point cloud data and the scene image data acquired via the laser radar and the image acquirer by synchronously collecting the scene may be input into the point cloud feature extraction model and the image feature extraction model respectively to obtain the point cloud descriptive feature of the scene and the image descriptive feature of the scene.

At block 220, the point cloud descriptive feature and the image descriptive feature of each target region in the scene are input into an object identifying model pretrained to obtain a detection result of object for each target region.

The target region refers to a region of the scene where an object is located. The target region may be obtained by following. After the point cloud descriptive feature and the image descriptive feature are obtained based on the point cloud feature extraction model and the image feature extraction model, the scene point cloud data or the scene image data may be divided into multiple regions within a coordinate system of the laser radar or a coordinate system of the imager (such as a camera) by evenly arranging the object blocks of the preset size. A simple detection model, such as a blob detection, may be used for the point cloud descriptive feature or the image descriptive feature of each region to detect each object included in the scene. A region including the object may be taken as the target region. In order to reduce the number of regions to be identified, some object blocks may be arranged only at potential positions according to experimental experiences in the coordinate system of the laser radar or the coordinate system of the imager (such as a camera). The simple detection model, such as a blob detection, may be adopted for the point cloud descriptive feature or the image descriptive feature of each object block, to remove a block including no object or unsatisfying a preset condition, to detect each object included in the scene. An object block including the object may be taken as the target region. The preset condition refers to a preset method of pre-processing each object block. For example, when a size of the object in an object block or the number of pixels of the object is smaller than a preset value, the object in the object block may be considered as a noise point.

In embodiments, as illustrated in FIG. 2C, the object identifying model may be obtained by training the third convolutional neural network model. The convolutional neural network may basically include two neuron layers, one is a convolutional layer and the other one is a pooling layer. An input of each neuron of the convolutional layer may be connected to a local region of a previous layer and features of the part may be extracted. The pooling layer may be a computing layer for obtaining a sensitivity of the local region and extracting secondary features. The structure of twice extracting features may reduce a resolution of the feature and reduce the number of parameters to be optimized.

Since the neuron in the convolutional layer only needs to connect with the local region of input data to share parameters among the neurons in the convolutional layer, in order to increase a training speed of the convolutional neural network and reduce a redundancy, for the third convolutional neural network model, a full-connected layer of the convolutional neural network may be converted into the convolutional layer in embodiments. That is, the third convolutional neural network model may be a full convolutional neural network model only including the pooling layer and the convolution layer. Thus, the object identifying model may be trained based on the full convolutional neural network.

The detection result of object may be an output result of the object identifying model, which may be a category of the object, such as a person, a tree, a vehicle and the like, or may also be a position, a size, an orientation of the object and the like. It should be noted that, multiple output layers may be set for the object identifying model as needed. Each output layer may cooperate with a different loss function to provide various detection results. For example, different detection results may be output for a same object.

In detail, after the point cloud descriptive feature and the image descriptive feature are obtained based on the point cloud feature extraction model and the image feature extraction model, the point cloud descriptive feature and the image descriptive feature of each target region in the scene may be input into the object identifying model, such that a detection result of object contained in each target region may be outputted by the object identifying model with existing parameters.

It should be noted that, in embodiments, descriptive features of the first and the second models (the point cloud feature extraction model and the image feature extraction model) of three models may be fused and the fused result may be inputted into the third model (the object identifying model), the detection result of object may be obtained by training a fusion feature by the third model. The present disclosure may provide a pre-fusion multi-sensor detection scheme compared with the existing post-fusion multi-sensor detection scheme. The pre-fusion multi-sensor detection scheme may not need a rule and a probability as a fusion basis to relate data to each other, thereby simplifying a detection process while detecting the object.

According to the technical solution of embodiments of the present disclosure, the scene point cloud data and the scene image data may be input into the point cloud feature extraction model and the image feature extraction model respectively to obtain the point cloud descriptive feature of the scene and the image descriptive feature of the scene. The point cloud descriptive feature and the image descriptive feature may be input into the object identifying model for each target region, to obtain the detection result of object included in each target region. Compared with the existing post-fusion multi-sensor detection scheme, the present disclosure may provide the pre-fusion multi-sensor detection scheme, which may not need a rule and a probability as the fusion basis to relate the data to each other, thereby simplifying the detection process while detecting the object.

Figure 3:
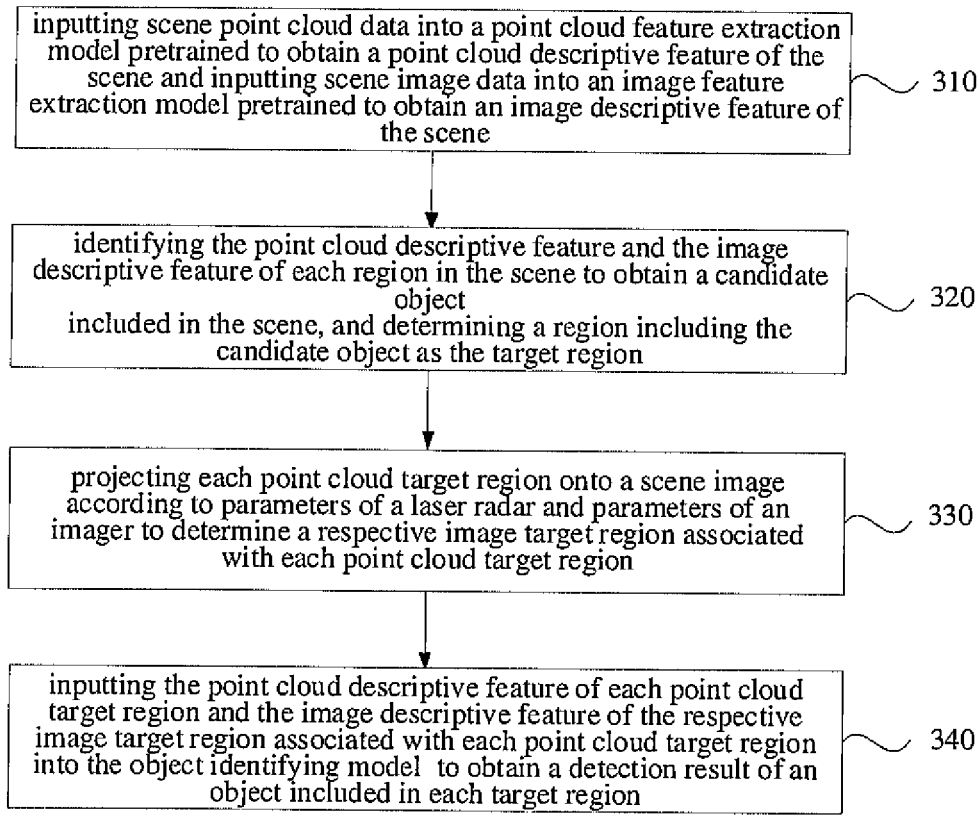
FIG. 3 is a flow chart illustrating an object detection method according to embodiments of the present disclosure.

FIG. 3 is a flow chart illustrating an object detection method according to embodiments of the present disclosure. On the basis of the above embodiment, further explanations and illustrations may be made to a process of inputting the point cloud descriptive feature and the image descriptive feature of each target region in the scene into the object identifying model pretrained, in embodiments. As illustrated in FIG. 3, the method may further include the following.

At block 310, the scene point cloud data is input into the point cloud feature extraction model pretrained to obtain the point cloud descriptive feature of the scene, and the scene image data is input into the image feature extraction model pretrained to obtain the image descriptive feature of the scene.

At block 320, the point cloud descriptive feature and the image descriptive feature of each region in the scene are identified, to obtain a candidate object included in the scene, and a region including a candidate object is determined as a target region.

The candidate object refers to an object, included in the scene, that may be a target.

In detail, the scene point cloud data may be divided into multiple regions in a coordinate system of the laser radar by evenly arranging object blocks of a preset size. The point cloud descriptive features of all regions may be traversed. A simple detection model (such as a blob detection) may be adopted for the point cloud descriptive feature of each region to identify the candidate object included in the scene. Each region including the candidate object may be taken as the target region. In some examples, the number of the target regions may be equal to the number of the candidate objects. One candidate object may correspond to one target region. Further, in order to distinguish the target regions, each target region may also be numbered using increased numbers.

At block 330, each point cloud target region is projected onto a scene image according to parameters of the laser radar and the imager, to determine a respective image target region associated with each point cloud target region.

The parameters may include a posture (such as a position and an orientation) and the like. The target region in the coordinate system of the laser radar may be the point cloud target region. Correspondingly, the target region in the coordinate system of the imager (such as a camera) may be the image target region. In some examples, each point cloud target region has a unique image target region corresponding thereto.

In detail, a relative posture of the laser radar and the imager may be determined according to parameters of the laser radar and the imager. For each point cloud target region, the point cloud target region may be projected onto the scene image according to the relative posture. A projection region on the scene image may be determined to be the image target region associated with the point cloud target region.

At block 340, the point cloud descriptive feature of each point cloud target region and the image descriptive feature of each associated image target region are input into the object identifying model, to obtain a detection result of object included in each target region.

In detail, after each image target region associated with each point cloud target region is determined, the point cloud descriptive feature of the each point cloud target region, the image descriptive feature of each associated image target region and each point cloud target region may be inputted into the object identifying model, such that the detection result of object may be outputted by the object identifying model for each target region.

It should be noted that, multiple output layers may be set for the object identifying model as needed. Each output layer may cooperate with a different loss function to output different detection results.

In detail, when the loss function set for the object identifying model is a category-related loss function, a category of the object may be output by the object identifying model. Exemplarily, obtaining the detection result of object included in each target region may include: determining a category of the object included in each target region. The category of the object refers to the category to which the object belongs, such as house, person, plant, vehicle, and the like. In some examples, when different objects correspond to different scenes, categories of the objects determined may be different. Different objects in the same scene may correspond to a same category or may correspond to different categories. For example, the object included in the target region 1 is a car, while the object included in the target region 2 is an electric car, However, both the category of the object in the target region 1 and the category of the object in the target region 2 output by the object identifying model are the vehicle.

When the loss function set for the object identifying model is a regression-related loss function for obtaining an exact position and orientation of the object, the object identifying model may output a position, an orientation and a size of the object. For example, obtaining the detection result of the object included in each target region may include the following. A position of the object may be corrected with the object identifying model. An orientation and a size of the object may be determined with the object identifying model. The orientation of the object refers to position and angle information of the object. The size of the object refers to an actual size of the object, such as a length, a width and a height of the object.

In detail, the point cloud descriptive feature of each point cloud target region, the image descriptive feature of each associated image target region and each point cloud target region may be input into the object identifying model. An algorithm similar to iterative closest point (ICP) may be adopted in the object identifying model to perform an offline registration to correct the position of the object in the target region. Thus, real coordinate information of the object may be obtained. In addition, at least one of the current orientation and the size of the object may be output.

According to the technical solution of embodiments of the present disclosure, the scene point cloud data and the scene image data are input into the point cloud feature extraction model pretrained and the image feature extraction model pretrained respectively to obtain the point cloud descriptive feature of the scene and the image descriptive feature of the scene. The point cloud descriptive feature and the image descriptive feature are input into the object identifying model for each target region, to obtain the detection result of the object included in each target region. Compared with the existing post-fusion multi-sensor detection scheme, the scheme of the present disclosure may provide the pre-fusion multi-sensor detection scheme. Therefore, there is no need to apply a rule and a probability as a fusion basis to relate data to each other, thereby simplifying the detection process while detecting the object.

Figure 4:
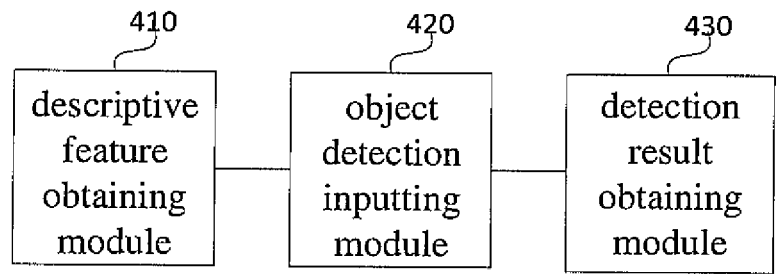
FIG. 4 is a block diagram illustrating an object detection apparatus according to embodiments of the present disclosure.

FIG. 4 is a block diagram illustrating an object detection apparatus according to embodiments of the present disclosure. The object detection apparatus may be configured to execute the object detection method according to any one of embodiments of the present disclosure and has corresponding function modules for executing the method and beneficial effects. As illustrated in FIG. 4, the object detection apparatus may include a descriptive feature obtaining module 410, an object detection inputting module 420 and a detection result obtaining module 430.

The descriptive feature obtaining module 410 may be configured to input scene point cloud data of a scene into a point cloud feature extraction model pretrained to obtain a point cloud descriptive feature of the scene and input scene image data of the scene into an image feature extraction model pretrained to obtain an image descriptive feature of the scene.

The object detection inputting module 420 may be configured to input the point cloud descriptive feature and the image descriptive feature of each target region in the scene into an object identifying model pretrained.

The detection result obtaining module 430 may be configured to obtain a detection result of an object included in each target region.

According to the technical resolution of embodiments of the present disclosure, the scene point cloud data and the scene image data are input into the point cloud feature extraction model pretrained and the image feature extraction model pretrained respectively to obtain the point cloud descriptive feature of the scene and the image descriptive feature of the scene. The point cloud descriptive feature and the image descriptive feature are input into the object identifying model for each target region to obtain the detection result of the object included in each target region. Compared with an existing post-fusion multi-sensor detection scheme, the present disclosure may provide a pre-fusion multi-sensor detection scheme, which does not need to apply a rule and a probability as a fusion basis to relate data to each other, thereby simplifying a detection process while detecting the object.

For example, the apparatus may further include a target region determining module. The target region determining module may be configured to, before inputting the point cloud descriptive feature and the image descriptive feature of each target region in the scene into the object identifying model pretrained, identify the point cloud descriptive feature and the image descriptive feature of each target region in the scene to obtain a candidate object included in the scene, and determine a region including the candidate object as the target region.

For example, the object detection inputting module 420 may be further configured to project each point cloud target region onto a scene image according to parameters of a laser radar and parameters of an imager to determine a respective image target region associated with each point cloud target region.

In addition, the object detection inputting module 420 may be further configured to input the point cloud descriptive feature of each point cloud target region and the image descriptive feature of the respective image target region associated with each point cloud target region into the object identifying model.

For example, the detection result obtaining module 430 may be further configured to determine a category of the object included in each target region.

For example, the detection result obtaining module 430 may be further configured to correct a position of the object with the object identifying model and determine an orientation of the object and/or a size of the object with the object identifying model.

Figure 5:
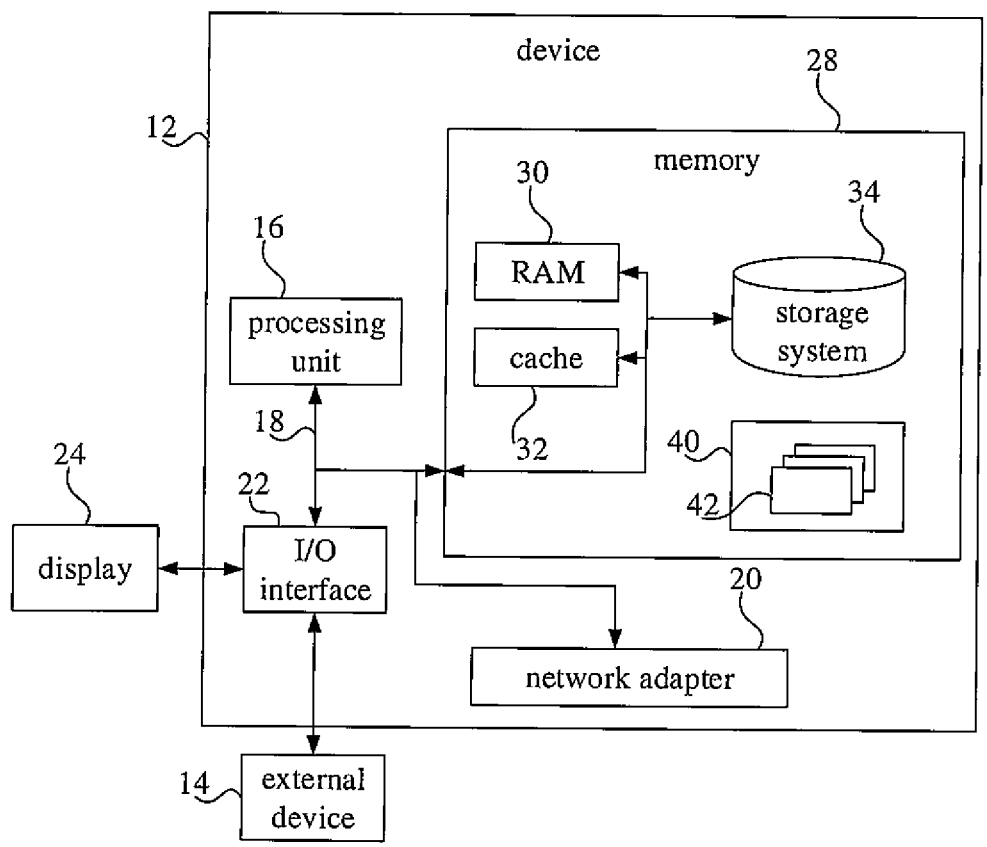
FIG. 5 is a block diagram illustrating a device according to embodiments of the present disclosure.

FIG. 5 is a block diagram illustrating a device according to embodiments of the present disclosure. A block diagram of an exemplary device 12 for implementing embodiments of the present disclosure is illustrated in FIG. 5. The device 12 illustrated in FIG. 5 is only illustrated as an example, and should not be considered as a restriction on the function and the usage range of embodiments of the present disclosure.

As illustrated in FIG. 5, the device 12 is in the form of a general-purpose computing apparatus. The device 12 may include, but not limited to, one or more processors or processing units 16, a system memory 28, and a bus 18 for connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the device 12 may include multiple kinds of computer-readable media. These media may be any storage media accessible by the device 12, including transitory or non-transitory storage medium and movable or unmovable storage medium.

The memory 28 may include a computer-readable medium in a form of volatile memory, such as a random-access memory (RAM) 30 and/or a high-speed cache memory 32. The device 12 may further include other transitory/non-transitory and movable/unmovable computer system storage media. In way of example only, the storage system 34 may be used to read and write from and to non-removable and non-volatile magnetic media (not illustrated in the figure, commonly referred to as "hard disk drives"). Although not illustrated in FIG. 5, a disk driver for reading and writing to and from movable and non-volatile magnetic disks (e.g. "floppy disks") may be provided, as well as an optical driver for reading and writing to and from movable and non-volatile optical disks (e.g. a compact disc read only memory (CD-ROM), a digital video disc read only Memory (DVD-ROM), or other optical media) may be provided. In these cases, each driver may be connected to the bus 18 via one or more data interfaces. The system memory 28 may include at least one program product. The program product may have a set of (for example at least one) program modules. The program modules may be configured to perform functions of embodiments of the present disclosure.

A program/application 40 having a set of (at least one) program modules 42 may be stored in system memory 28. The program modules 42 may include, but not limit to, an operating system, one or more application programs, other program modules and program data. Any one or a combination of above examples may include an implementation in a network environment. The program modules 42 may be generally configured to implement functions and/or methods described in embodiments of the present disclosure.

The device 12 may also communicate with one or more external devices 14 (e.g., a keyboard, a pointing device, a display 24, and etc.) and may also communicate with one or more devices that enables a user to interact with the device 12, and/or any device (e.g., a network card, a modem, etc.) that enables the device 12 to communicate with one or more other computing devices. The above communications can be achieved by the input/output (I/O) interface 22. In addition, in the device 12 of embodiments, the display 24 may be not a separate physical entity, but may be embedded into a mirror. When nothing is displayed on a display surface of the display 24, the display surface of the display 24 may be visually same to the mirror. In addition, the device 120 may be connected to and communicate with one or more networks such as a local area network (LAN), a wide area network (WAN) and/or a public network such as the Internet through a network adapter 20. As illustrated in FIG. 5, the network adapter 20 may communicate with other modules of the device 12 over the bus 18. It should be understood that although not illustrated in the figures, other hardware and/or software modules may be used in combination with the device 12, including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the object detection method according to embodiments of the present disclosure.

Embodiments of the present disclosure provide a computer readable storage medium, having computer programs stored thereon that when executed by a processor cause the processor to perform the object detection method according to embodiments of the present disclosure.

A combination of one or more computer readable media may be used. The computer readable medium may be a computer readable signal medium or a computer readable storage medium. The computer readable storage medium may be, but not limited to, for example, electrical, magnetic, optical, electromagnetic, infrared, or semiconductor system, apparatus, device, component or any combination thereof. A specific example of the computer readable storage medium includes (a non-exhaustive list): an electrical connection having one or more wires, a portable computer disk, a hard disk, a random access memory (RAM), a read only memory (ROM), an erasable programmable read only memory (EPROM or a flash memory), an optical fiber, a compact disc read-only memory (CD-ROM), an optical memory component, a magnetic memory component, or any suitable combination thereof. In the specification, the computer readable storage medium may be any tangible medium including or storing programs. The programs may be used by an instruction executed system, apparatus, device, or a connection thereof.

The computer readable signal medium may include a data signal propagated in baseband or as a part of carrier and carries computer readable program codes. Such propagated data signal may be in many forms, including but not limited to an electromagnetic signal, an optical signal, or any suitable combination thereof. The computer readable signal medium may also be any computer readable medium other than the computer readable storage medium. The computer readable medium may send, propagate, or transport programs used by an instruction executed system, apparatus, device, or a connection thereof.

The program codes stored on the computer readable medium may be transmitted using any appropriate medium, including but not limited to wireless, wireline, optical fiber cable, RF, or any suitable combination thereof.

The computer program codes for carrying out operations of embodiments of the present disclosure may be written in one or more programming languages. The programming language includes an object oriented programming language, such as Java, Smalltalk, C++, as well as conventional procedural programming language, such as "C" language or similar programming language. The program codes may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a local area network (hereafter referred as to LAN) or a wide area network (hereafter referred as to WAN).

In addition, embodiments of the present disclosure further provide a vehicle. The vehicle includes a vehicle body, the device according to any one of embodiments of the present disclosure arranged on the vehicle body and a laser radar and an imager connected in communication with the device.

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. An object detection method, comprising:
   inputting scene point cloud data of a scene into a point cloud feature extraction model pretrained to obtain a point cloud description feature of the scene, and inputting scene image data of the scene into an image feature extraction model pretrained to obtain an image descriptive feature of the scene into an image feature extraction model pretrained to obtain an image descriptive feature of the scene; and
   inputting the point cloud descriptive feature and the image descriptive feature of each target region in the scene into an object identifying model pretrained, to obtain a detection result of an object comprised in each target region;
   wherein inputting the point cloud descriptive feature and the image descriptive feature of each target region in the scene into the object identifying model pretrained comprises:
   projecting each point cloud target region onto a scene image according to parameters of a laser radar and parameters of an imager, to determine a respective image target region associated with each point cloud target region; and
   inputting the point cloud descriptive feature of each point cloud target region and the image descriptive feature of the respective image target region associated with each point cloud target region into the object identifying model.

2. The method of claim 1, further comprising:
   identifying the point cloud descriptive feature or the image descriptive feature of each target region in the scene, to obtain a candidate object comprised in the scene, and determining a region comprising the candidate object as the target region.

3. The method of claim 1, wherein obtaining the detection result of the object comprised in each target region comprises:
   determining a category of the object comprised in each target region.

4. The method of claim 1, wherein obtaining the detection result of the object comprised in each target region comprises:
   correcting a position of the object with the object identifying model; and
   determining an orientation of the object, or a size of the object, or both the orientation and the size with the object identifying model.

5. The method of claim 1, wherein the object identifying model is obtained by training a full convolution network.

6. An electronic device, comprising:
   one or more processors; and
   a memory, configured to store one or more programs that when executed by the one or more processors cause the one or more processors to input scene point cloud data of a scene into a point cloud feature extraction model pretrained to obtain a point cloud descriptive feature of the scene, and input scene image data of the scene into an image feature extraction model pretrained to obtain an image descriptive feature of the scene; and
   input the point cloud descriptive feature and the image descriptive feature of each target region in the scene into an object identifying model pretrained, to obtain a detection result of an object comprised in each target region;
   wherein the one or more processors are caused to:
   project each point cloud target region onto a scene image according to parameters of a laser radar and parameters of an imager, to determine a respective image target region associated with each point cloud target region; and
   input the point cloud descriptive feature of each point cloud target region and the image descriptive feature of the respective image target region associated with each point cloud target region into the object identifying model.

7. The electronic device of claim 6, wherein the one or more processors are further caused to:
   identify the point cloud descriptive feature or the image descriptive feature of each target region in the scene, to obtain a candidate object comprised in the scene, and determine a region comprising the candidate object as the target region.

8. The electronic device of claim 6, wherein the one or more processors are caused to obtain the detection result of the object comprised in each target region by:
   determining a category of the object comprised in each target region.

9. The electronic device of claim 6, wherein the one or more processors are caused to obtain the detection result of the object comprised in each target region by:
   correcting a position of the object with the object identifying model; and
   determining an orientation of the object, or a size of the object, or both the orientation and the size with the object identifying model.

10. The electronic device of claim 6, wherein the object identifying model is obtained by training a full convolution network.

11. A non-transitory computer readable storage medium, having computer programs stored thereon that when executed by a processor cause the processor to perform the object detection method, the object detection method comprises:
inputting scene point cloud data of a scene into a point cloud feature extraction model pretrained to obtain a point cloud descriptive feature of the scene, and inputting scene image data of the scene into an image feature extraction model pretrained to obtain an image descriptive feature of the scene; and
inputting the point cloud descriptive feature and the image descriptive feature of each target region in the scene into an object identifying model pretrained, to obtain a detection result of an object comprised in each target region;
wherein inputting the point cloud descriptive feature and the image descriptive feature of each target region in the scene into the object identifying model pretrained comprises:
projecting each point cloud target region onto a scene image according to parameters of a laser radar and parameters of an imager, to determine a respective image target region associated with each point cloud target region; and
inputting the point cloud descriptive feature of each point cloud target region and the image descriptive feature of the respective image target region associated with each point cloud target region into the object identifying model.

12. The non-transitory computer readable storage medium of claim 11, wherein the object detection method further comprises:
identifying the point cloud descriptive feature or the image descriptive feature of each target region in the scene, to obtain a candidate object comprised in the scene, and determining a region comprising the candidate object as the target region.

13. The non-transitory computer readable storage medium of claim 11, wherein obtaining the detection result of the object comprised in each target region comprises:
determining a category of the object comprised in each region.

14. The non-transitory computer readable storage medium of claim 11, wherein obtaining the detection result of the object comprised in each target region comprises:
correcting a position of the object with the object identifying model; and
determining an orientation of the object, or size of the object, or both the orientation and the size with the object identifying model.

15. The no-transitory computer readable storage medium of claim 11, wherein the object identifying model is obtained by training a full convolution network.

* * * * *